US010054012B2

(12) United States Patent
Juretzek

(10) Patent No.: US 10,054,012 B2
(45) Date of Patent: Aug. 21, 2018

(54) FLASH TANK DESIGN

(71) Applicant: Siemens Aktiengesellschaft, Munich (DE)

(72) Inventor: Uwe Juretzek, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 92 days.

(21) Appl. No.: 15/120,029

(22) PCT Filed: Feb. 12, 2015

(86) PCT No.: PCT/EP2015/052960
§ 371 (c)(1),
(2) Date: Aug. 18, 2016

(87) PCT Pub. No.: WO2015/132058
PCT Pub. Date: Sep. 11, 2015

(65) Prior Publication Data
US 2017/0058707 A1 Mar. 2, 2017

(30) Foreign Application Priority Data
Mar. 5, 2014 (DE) ........................ 10 2014 203 967

(51) Int. Cl.
*F01K 17/06* (2006.01)
*F22D 11/00* (2006.01)
(Continued)

(52) U.S. Cl.
CPC ................ *F01K 17/06* (2013.01); *F01K 7/16* (2013.01); *F01K 7/22* (2013.01); *F01K 23/10* (2013.01);
(Continued)

(58) Field of Classification Search
CPC ... F01K 17/06; F01K 7/16; F01K 7/22; F01K 23/10; F22D 11/003; F22B 37/50; Y02E 20/16
(Continued)

(56) References Cited

U.S. PATENT DOCUMENTS 3,611,718 A * 10/1971 Nebgen .................. F01K 23/10 60/39.182
4,214,450 A 7/1980 Nagashima et al.
(Continued)

FOREIGN PATENT DOCUMENTS

CN 101415992 A 4/2009
CN 202018031 U 10/2011
(Continued)

OTHER PUBLICATIONS

KR Notice of Allowance dated Oct. 31, 2017, for KR patent application No. 1020167027019.
(Continued)

*Primary Examiner* — Hoang Nguyen
(74) *Attorney, Agent, or Firm* — Beusse Wolter Sanks & Maire

(57) ABSTRACT

A water-steam circuit of a power plant includes at least one low-pressure steam system and a reservoir for waste water from the water-steam circuit, wherein the reservoir has, in addition to at least one waste water feed line, a further heat supply from the water-steam circuit and a steam outlet which is connected via a waste steam pipe to the low-pressure steam system of the water-steam circuit. A method for cleaning waste water from a power plant having a water-steam circuit, wherein the waste water is conducted into a reservoir and, in addition to a steam fraction generated by automatic evaporation of waste water in the reservoir, a water fraction that is also produced is evaporated using
(Continued)

energy from the water-steam circuit, and the entire steam mass flow is introduced into a low-pressure steam system of the power plant.

17 Claims, 3 Drawing Sheets

(51) Int. Cl.
*F01K 7/16* (2006.01)
*F01K 7/22* (2006.01)
*F01K 23/10* (2006.01)
*F22B 37/50* (2006.01)

(52) U.S. Cl.
CPC ............ *F22B 37/50* (2013.01); *F22D 11/003* (2013.01); *Y02E 20/16* (2013.01)

(58) Field of Classification Search
USPC ............................................ 60/653, 677–680
See application file for complete search history.

(56) References Cited

U.S. PATENT DOCUMENTS 5,477,683 A * 12/1995 Persson ..................... F01K 7/22 60/646
6,047,548 A * 4/2000 Bruckner .............. F01K 23/106 60/677
8,499,561 B2 * 8/2013 Kluge ..................... F01K 3/181 60/653
2001/0017030 A1 * 8/2001 Hannemann .......... F01K 23/068 60/39.12
2005/0092672 A1 5/2005 Beaupre
2007/0289304 A1 12/2007 Schottler et al.
2007/0289926 A1 12/2007 Schoettler et al.
2008/0104959 A1 5/2008 Schottler et al.
2008/0250789 A1 10/2008 Myers et al.
2009/0165460 A1 7/2009 Juretzek
2011/0265444 A1 11/2011 Bellows et al.
2014/0223823 A1 8/2014 Kar et al.
2015/0323176 A1 11/2015 Schmid et al.

FOREIGN PATENT DOCUMENTS

EP 1706188 B1 10/2006
EP 2746656 A1 6/2014
JP 2013527370 A 6/2013
WO 2005068905 A1 7/2005
WO 2007077248 A2 7/2007
WO 2012066490 A1 5/2012
WO 2013041543 A1 3/2013
WO 2013170916 A1 11/2013
WO 2013171698 A2 11/2013

OTHER PUBLICATIONS

DE Search Report, dated Oct. 21, 2014, in DE application No. 102014203967.3.
IPRP (PCT/IPEA/416) dated Feb. 8, 2016, in PCT/EP2015/052960.
International Search Report dated May 15, 2015, in PCT/EP2015/052960.
CN Office Action dated Feb. 23, 2017, for CN patent application No. 201580011392.4.

* cited by examiner 1
2
3
4
5, 10
6
7
8
9
11
12
14
15
17
21
22
23
24
25
26
27
28
29
30
31
32
33
34
35
36
37
38
39
40
41
42
43

1
2
3
4
5, 13
6
7
8
11
12
14
15
17
21
22
23
24
25
26
27
28
29
30
31
32
33
34
35
36
37
38
39
40
41
42
43

1
2
3
4
5, 13
6
7
8
11
12
14
15
16
17
18
19
20
21
22
23
24
25
26
27
28
29
30
31
32
33
34
35
36
37
38
39
40
41
42
43

FLASH TANK DESIGN

CROSS REFERENCE TO RELATED APPLICATIONS

This application is the U.S. National Stage of International Application No. PCT/EP2015/052960 filed Feb. 12, 2015, and claims the benefit thereof. The International Application claims the benefit of German Application No. DE 102014203967.3 filed Mar. 5, 2014. All of the applications are incorporated by reference herein in their entirety.

FIELD OF INVENTION

The invention relates to a water-steam circuit of a power plant, in particular of a combined-cycle turbine plant, and relates to the preparation and recycling of boiler waste water. The invention also relates to a method for purifying waste water of a power plant.

BACKGROUND OF INVENTION

Power plants with boilers generally experience discontinuous accumulation of operating waste water. In particular in the case of natural-circulation and forced-circulation boilers (drum boilers), there is a need to remove the impurities from the circuit via the drains on the boiler drum.

In the case of power plants having drum boilers, the boiler waste water accumulating during plant operation can generally be divided into two groups. "Clean" waste water, that is to say water from the drains in the steam region (drains of the superheater heating surfaces in the boiler), can be directly reused in the water-steam circuit by virtue of the chemical composition of the waste water. In the case of "dirty" waste water from the drains in the "water region" (drum drains), in which the chemical composition of the waste water does not permit direct reuse in the water-steam circuit, reprocessing is provided prior to reuse.

The "cleanliness" of the water from the drains in the steam region is due to the fact that, upon separation into a water phase and a steam phase in the boiler drum, any impurities remain in the water phase and the steam is "clean" as it leaves the drum.

In that context, it is desirable, with a view to reducing operating costs, to reduce the accumulation of waste water and/or to reuse this operating waste water. This is opposed, on the other hand, by corresponding difficulties in the construction of the power plant, such that it was generally not realistic, with the technical options known hitherto and with respect to the economic viability of the plant as a whole, to minimize this accumulation of waste water.

The operating waste water that accumulates is therefore generally simply collected and then discarded wholesale, i.e. finally poured into the general waste water system. In that context, it is generally necessary to process the waste water beforehand according to the legal boundary conditions. It must be assumed, on the basis of the foreseeable further tightening of environmental protection regulations, that in the future a reduction in the quantity of waste water will be legally imposed, or that the discharge of waste water, including processing, is made so expensive that a reduction in the quantity of waste water becomes economically realistic. In addition, this operating waste water has to be replaced with (completely desalinated) circuit water, which is costly to prepare, thus giving rise to investment costs (for a sufficiently large complete desalination plant) on one hand and to operating costs on the other.

Furthermore, the discharge of this generally very hot operating waste water of the boiler represents a significant energy loss which is evidenced during operation by a loss of efficiency and of power of the power plant, or during shutdown by more rapid cooling of the boiler. The latter is damaging, in particular in relation to possible start-up times and reduction in the service life of thick-walled boiler components.

Hitherto, the boiler waste water—so that it would not necessarily have to be discarded—was collected (partially separated into clean and contaminated waste water), cooled, where necessary reprocessed by means of a condensate purification plant, stored and fed back to the circuit in a greater or lesser quantity. Hitherto, the energy contained in the waste water was given off to the environment, unused (in part via special cooling systems).

WO 2007/077248 discloses at least how the quantity of water that accumulates and is to be cleaned can be reduced, this being done by the clean boiler waste water being intercepted by collection pipes assigned to individual pressure stages and being fed directly back to the respective evaporators. Thus, water that accumulates, in particular during shutdown, can be stored in the boiler itself and no external storage capacity is required.

SUMMARY OF INVENTION

The invention has an object of specifying an improved water-steam circuit and an improved method for purifying waste water of a power plant.

According to the invention, this object is achieved with the device and the method as claimed. The respective dependent claims define advantageous refinements of the invention. In a water-steam circuit of a power plant comprising at least one low-pressure steam system and a vessel for waste water from the water-steam circuit, the fact that the vessel has, in addition to at least one waste water inflow line, another heat supply from the water-steam circuit and a steam outlet that is connected, via a waste steam pipe, to the low-pressure steam system of the water-steam circuit has the effect that, during operation of the power plant, in addition to the steam fraction resulting from automatic evaporation of contaminated boiler waste water in the vessel (flash tank), the water fraction that continues to accumulate is evaporated using energy from the water-steam circuit and this total steam mass flow is introduced into the low-pressure steam system, is thus retained in the circuit and contributes to the performance of the steam section of the power plant.

The post-evaporation produces clean steam from contaminated boiler waste water and the remaining quantity of waste water is reduced significantly, or even entirely, by the contaminants being crystallized out.

In one advantageous embodiment of the invention, the water-steam circuit further comprises an intermediate-pressure steam system, wherein, for the further supply of heat in the vessel, an intermediate-pressure steam line branches off from the intermediate-pressure steam system and discharges into a steam inlet of the vessel. This solution is particularly cost-effective but incurs a loss of efficiency, although this is relatively small. However, this loss of efficiency occurs only specifically when boiler waste water accumulates (and therefore very sporadically).

In that context, it is advantageous if the intermediate-pressure steam line branches off from a cold reheater line, since during start-up of the power plant steam from the reheater line is already available at a relatively early point because the high-pressure evaporator is in operation. Alternatively, it is also possible for steam to be taken from the intermediate-pressure steam system at another location, for example from the hot reheater line. This would have the advantage that it would not be necessary to take into account an effect on the waste heat boiler due to the extraction of steam.

In one alternative embodiment of the invention, for the supply of heat, there is arranged in the vessel a heat exchanger which, during operation, can be charged on the primary side with hot water whose temperature is above a temperature corresponding to the evaporation pressure in the vessel.

With respect to the required temperature, it is expedient if, for the purpose of charging the heat exchanger with hot water, the heat exchanger is connected to an intermediate-pressure feed water preheater.

In another advantageous embodiment of the water-steam circuit, a jet pump, that is connected on the working medium side to a high-pressure or intermediate-pressure steam system, is connected into the waste steam pipe such that it is connected, on the intake medium side, to the steam outlet of the vessel and, on the outlet side, to the low-pressure steam system. This jet pump reduces the pressure in the vessel and compresses the steam produced in the vessel to the point that it can be fed to the adjoining low-pressure steam system. It is thus possible to use hot water at a lower temperature for heating the heat exchanger in the vessel. It is then for example expedient if, for the purpose of charging the heat exchanger with hot water, the heat exchanger is connected to a condensate preheater.

In particular, in the case of this solution, the waste steam pipe can advantageously discharge into a low-pressure steam line leading to a steam turbine. As a consequence of the propellant steam from the high-pressure or intermediate-pressure system, there is namely, in the waste steam pipe at the transition to the low-pressure steam system, steam at a higher temperature than is the case for the solutions without a jet pump.

In order to minimize the quantity of water that is to be processed, it is moreover advantageous if the water-steam circuit has at least one evaporator and at least one superheater connected downstream of the evaporator, and, arranged between the superheater and the evaporator, a condensate collection and return line for intercepting condensate present in the superheater and returning the condensate into the evaporator.

In the inventive method for purifying waste water of a power plant having a water-steam circuit, the waste water is guided into a vessel and, in addition to a steam fraction produced by automatic evaporation of waste water in the vessel, a water fraction that continues to accumulate is evaporated using energy from the water-steam circuit and the total steam mass flow is guided into a low-pressure steam system of the power plant.

For the purpose of providing the energy required for evaporation, intermediate-pressure steam or high-pressure steam is expediently introduced into the vessel.

In an alternative method, a heat exchanger arranged in the water region of the vessel is charged on the primary side with water at a temperature that is above a temperature corresponding to the evaporation pressure in the vessel.

With regard to the required temperature, it is advantageous if the heat exchanger is charged with water from an intermediate-pressure feed water preheater.

Alternatively, it can be advantageous if a jet pump is operated with high-pressure or intermediate-pressure steam, and the jet pump causes a pressure reduction in the vessel and steam issuing from the jet pump is supplied to a low-pressure steam system.

With the reduced pressure in the vessel, it is then expedient if the heat exchanger is charged with water from a condensate preheater.

In order to minimize the purification burden, it is advantageous if relatively pure boiler waste water is intercepted by condensate collection and return lines assigned to individual pressure stages and is fed directly back to respective evaporators.

The small quantity of waste water still remaining after this (the extreme case of "no residual waste water at all" is also conceivable) can then either be discharged into the public waste water system or be fed to further processing steps.

In comparison to a system which merely collects and then discards the waste water, almost no additional hardware is required. Quite the opposite: by virtue of the corresponding reduction in the quantity of circuit top-up water, it is possible to save costs for the full desalination plant since the latter can be of reduced size or even dispensed with entirely. In addition, operating costs are reduced. It is precisely in the case of the very low water requirement imposed by this solution that external supply by tanker or a temporary water processing plant without its own regeneration can be achieved very cost-effectively.

The cost-intensive cooling systems, condensate processing plants, separate collection tanks, etc., which were necessary hitherto for recycling in the water-steam circuit, are dispensed with entirely (since both the resulting heat and the water is retained from the beginning in the circuit instead of being cooled and then reprocessed by means of a condensate purification plant, stored and only then fed back to the circuit).

Once the heat has been retained in the circuit, the negative influence, on the power and efficiency of the power plant, of opening the boiler drains during load operation is also reduced. Although this is contrasted by the energy requirement for post-evaporating the "dirty water phase", overall the "closed" system according to the invention is at least on a par with the old "open" system in terms of power and efficiency of the power plant.

Furthermore, the closed system according to the invention reduces in particular the heat loss during shutdown, i.e. cooling of the boiler during shutdown is accordingly slower, which permits quicker re-starting with less reduction in service life. Also, the time during which the auxiliary steam system of the power plant can be supplied from the waste heat boiler without the involvement of an auxiliary boiler is extended.

BRIEF DESCRIPTION OF THE DRAWINGS

The invention will be explained in more detail, and by way of example, with reference to the drawings. In the drawings, which are schematic and not to scale.

DETAILED DESCRIPTION OF INVENTION

Figure 1:
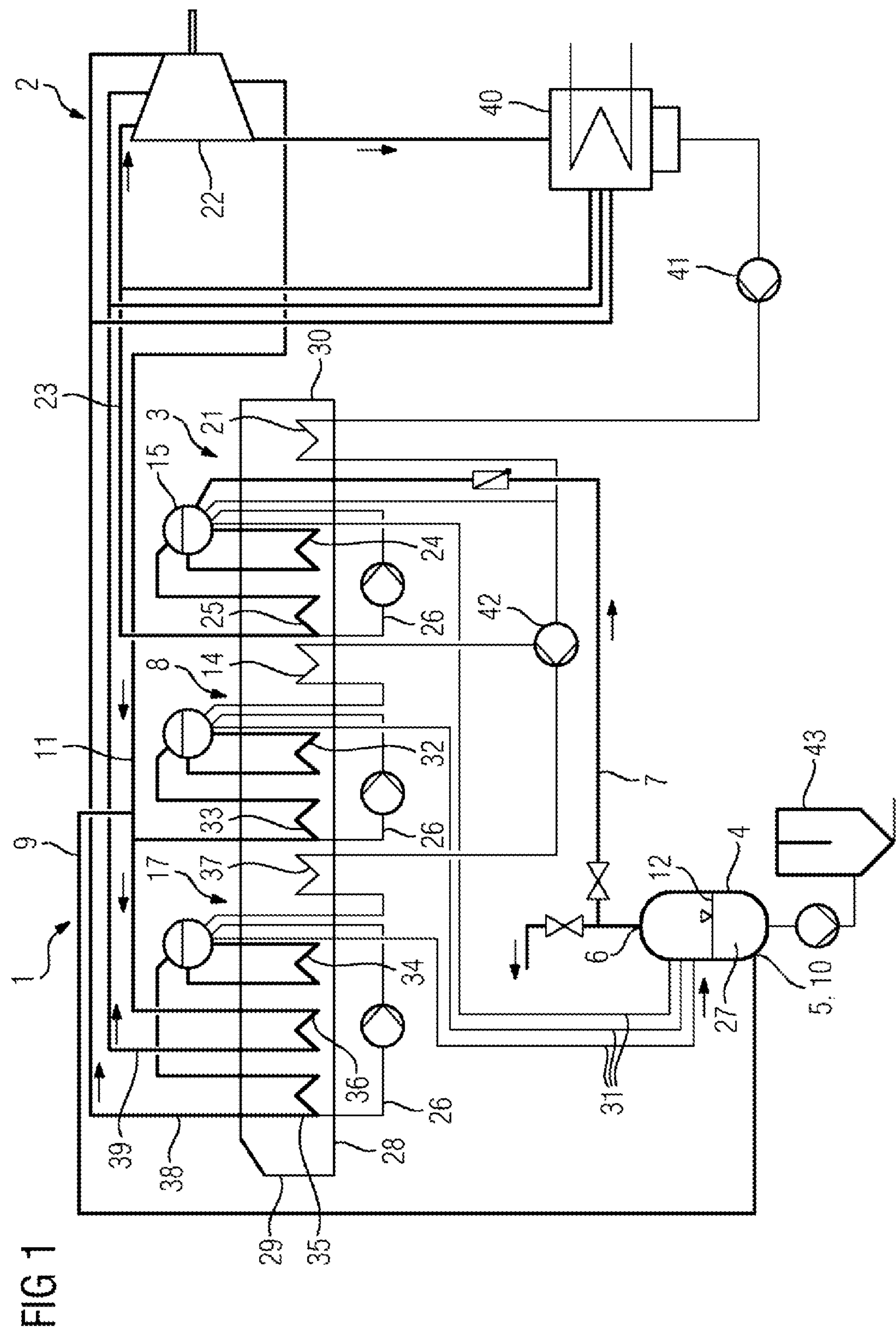
FIG. 1 shows a first exemplary embodiment of the inventive water-steam circuit of a power plant.

FIG. 1 shows, in a schematic and highly simplified manner, a first exemplary embodiment of the inventive water-steam circuit 1 of a power plant 2, using the example of a combined-cycle turbine plant. A gas turbine (not shown) is connected to the waste heat steam generator 28 which is provided for generating the operating steam of the steam turbine 22 using waste heat from the gas turbine.

The exhaust gases from the gas turbine—which are still at approximately 550 to 650° C.—are supplied to the waste heat steam generator 28, flow through it from the exhaust gas inlet 29 to the exhaust gas outlet 30 and leave the waste heat steam generator 28 toward a chimney (not shown in greater detail).

The waste heat steam generator 28 in the example of FIG. 1 is embodied as a multi-pressure boiler with natural circulation and comprises a low-pressure steam system 3, an intermediate-pressure steam system 8 and a high-pressure steam system 17. However, this invention can also be used in the case of waste heat steam generators that are embodied in individual or all evaporator pressure stages as forced-circulation or as forced once-through evaporators.

On their path through the waste heat steam generator 28, the hot exhaust gases of the gas turbine carry their heat to a high-pressure superheater 35, then to a reheater 36, onward to a high-pressure evaporator 34, a high-pressure preheater 37, then to an intermediate-pressure superheater 33, an intermediate-pressure evaporator 32, an intermediate-pressure preheater (or also intermediate-pressure feed water preheater) 14, then to a low-pressure superheater 25, an intermediate-pressure evaporator 24 and finally to a condensate preheater 21.

Steam that has been superheated in the high-pressure superheater 35 is fed through a steam discharge line 38 to a high-pressure stage of the steam turbine 22, where it is expanded, performing work. The hot steam that has been partially expanded in the high-pressure stage is then fed, together with steam from the intermediate-pressure superheater 33, to the reheater 36 where it is re- or further superheated and fed via a discharge line 39 to an intermediate-pressure stage of the steam turbine 22, where it is expanded, performing mechanical work. The steam that has been partially expanded there is fed, together with the low-pressure steam from the low-pressure steam system 3 of the waste heat steam generator 28, to a low-pressure stage of the steam turbine 22, where it is further expanded, releasing mechanical energy.

The expanded steam is condensed in the condenser 40, and the condensate thus produced is fed, by means of a condensate pump 41 and after heating in the condensate preheater 21, directly to the low-pressure steam system 3 or, by means of a feed water pump 42—and appropriately pressurized thereby—to the intermediate-pressure steam system 8 or to the high-pressure steam system 17, where the condensate is evaporated. After steam generation and superheating, the steam is fed back to the steam turbine 22 to be expanded and to provide mechanical work.

During operation of the power plant 2, operating waste water accumulates discontinuously in the water-steam circuit 1. In particular in the case of natural-circulation and forced-circulation boilers (drum boilers), there is therefore a need to remove the impurities from the circuit via the drains on the boiler drum.

To that end, there is provided in the water-steam circuit 1 of FIG. 1 a vessel 4 which has waste water inlet lines 31 from the low-pressure 3, intermediate-pressure 8 and high-pressure 17 steam systems, via which, along with the waste water, heat is also fed to the vessel 4. In that context, part of the waste water which enters will evaporate immediately, the other part accumulates as boiling water. The pressure in the vessel 4 is fixed such that the internal pressure of the vessel matches the low-pressure evaporator pressure. This is achieved by the steam outlet 6 on the vessel 4, which connects, via a waste steam pipe 7, to the low-pressure steam system 3, in the example of FIG. 1 to the low-pressure drum 15. This waste steam pipe 7 conveys the steam resulting from evaporation into the connecting system.

The residual waste water remaining after evaporation is further evaporated by means of a further supply of heat 5 from the water-steam circuit 1, and the resulting steam is again fed to the low-pressure steam system 3 via the waste steam pipe 7. To that end, intermediate-pressure steam from the cold reheater line 11 is conveyed, via an intermediate-pressure steam line 9, into the vessel 4. A corresponding steam inlet 10 on the vessel 4 is arranged, in the exemplary embodiment, below the waterline 12. A different arrangement is conceivable, however.

The small quantity of residual waste water still remaining after this can then either be discharged into the public waste water system or be fed to further processing steps 43.

Figure 2:
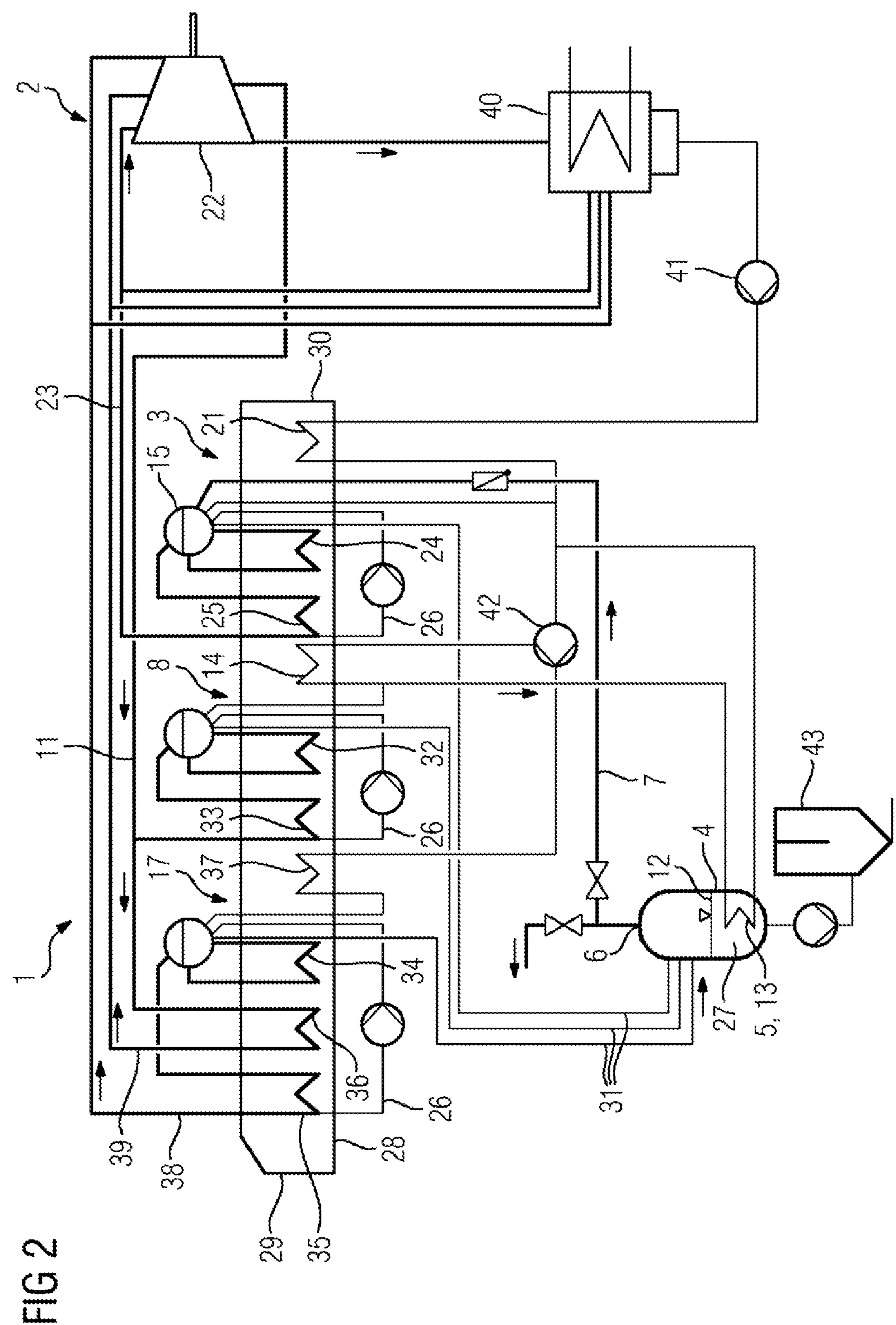
FIG. 2 shows a second exemplary embodiment of the inventive water-steam circuit of a power plant.

FIG. 2 shows another embodiment of the water-steam circuit 1 according to the invention, in which a heat exchanger 13 arranged in the water region 27 of the vessel 4 is heated using hot water from the intermediate-pressure feed water preheater 14. In this exemplary embodiment too, the waste steam pipe 7 discharges into the low-pressure drum 15.

Figure 3:
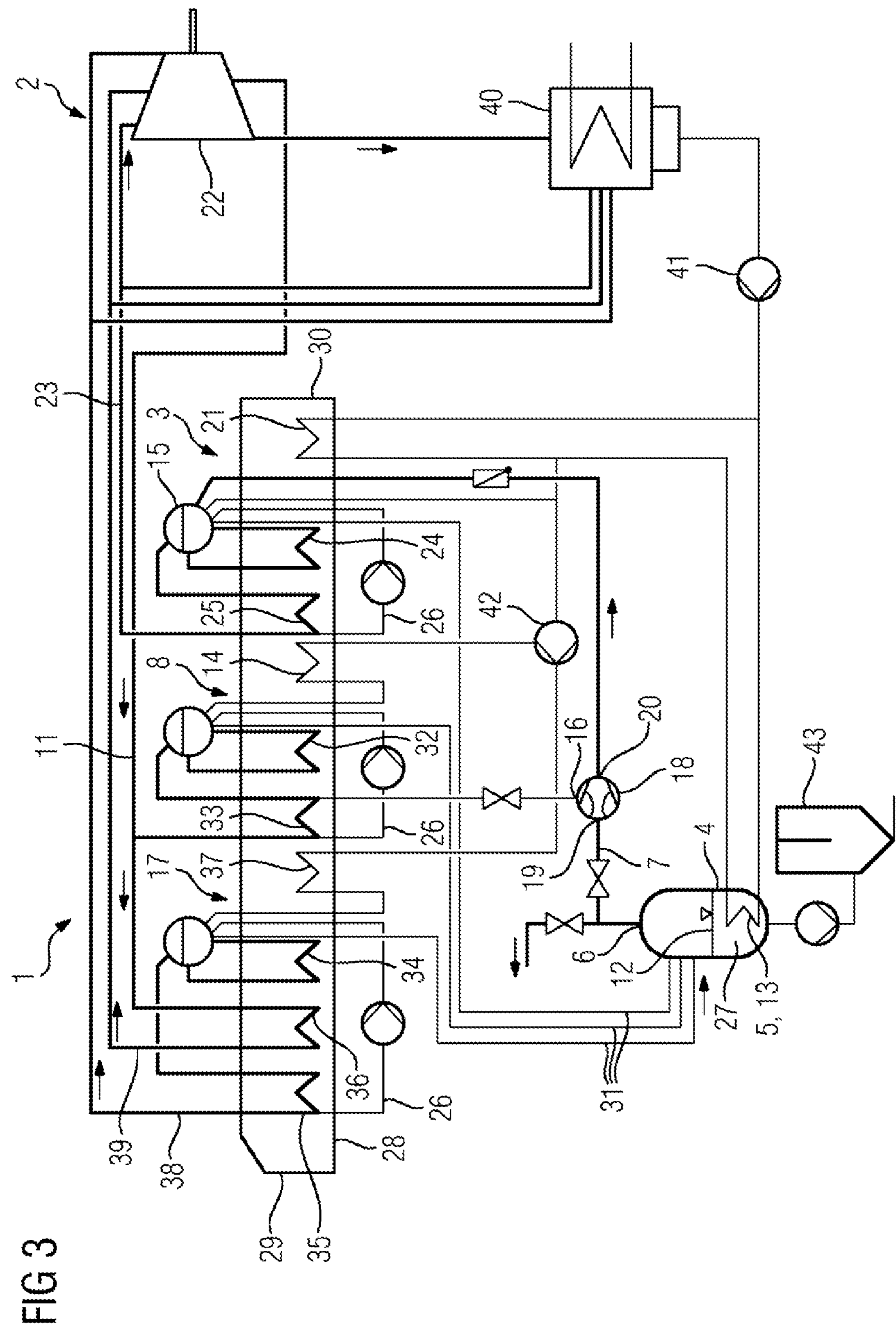
FIG. 3 shows a third exemplary embodiment of the inventive water-steam circuit of a power plant.

The embodiment of FIG. 3 adds, to the example of FIG. 2, a jet pump 18 which is operated using steam from the high-pressure 17 or intermediate-pressure 8 steam system of the waste heat steam generator 28, and which reduces the pressure in the vessel 4 and compresses the steam produced in the vessel 4 to the point that it can be fed to the low-pressure steam line 23. It is thus possible to use, for heating the heat exchanger 13, hot water at a lower temperature than in the example of FIG. 2.

In that context, the jet pump 18, that is connected on the working medium side 16 to the intermediate-pressure steam system 8, is connected into the waste steam pipe 7 such that it is connected, on the intake medium side 19, to the steam outlet 6 of the vessel 4 and, on the outlet side 20, to the low-pressure steam line 23.

By virtue of the lower temperature (in comparison to the embodiment of FIG. 2) required for heating the heat exchanger 13, the latter is connected, in the exemplary embodiment of FIG. 3, to the condensate preheater 21.

In all exemplary embodiments, the water-steam circuit 1 has, arranged between the superheaters 25, 33, 35 and the respective associated evaporators 24, 32, 34, condensate collection and return lines 26 for intercepting condensate present in the superheaters 25, 33, 35 and for returning the condensate into the evaporators 24, 32, 34.

This measure is not essential, but relieves the water processing in the vessel 4 since the clean boiler waste water are fed directly back to the respective evaporators and need not pass through the vessel 4 beforehand.

The invention claimed is:

1. A water-steam circuit of a power plant comprising:

at least one low-pressure steam system, and a vessel for waste water from the water-steam circuit, comprising at least one waste water inflow line configured to deliver waste water from a respective steam drum of the water-steam circuit to the vessel, wherein the waste water from the water-steam circuit functions as a first supply of heat from the water-steam circuit to the vessel, wherein the vessel is further configured to receive a discrete, second supply of heat from the water-steam circuit, effective to evaporate an accumulating water fraction in the vessel using energy from the second supply of heat from the water-steam circuit, the vessel further comprising a steam outlet that is connected, via a waste steam pipe, to the at least one low-pressure steam system of the water-steam circuit and adapted for introducing an entire steam mass flow from the vessel into the at least one low-pressure steam system of the power plant.

2. The water-steam circuit as claimed in claim 1, further comprising:

an intermediate-pressure steam system, wherein, for the second supply of heat, an intermediate-pressure steam line branches off from the intermediate-pressure steam system and discharges into a steam inlet of the vessel.

3. The water-steam circuit as claimed in claim 2, wherein the intermediate-pressure steam line branches off from a cold reheater line.

4. The water-steam circuit as claimed in claim 2, wherein the intermediate-pressure steam line branches off from a hot reheater line.

5. The water-steam circuit as claimed in claim 1, wherein, for the second supply of heat, there is arranged in the vessel a heat exchanger which, during operation, is charged on the primary side with hot water whose temperature is above a temperature corresponding to an evaporation pressure in the vessel.

6. The water-steam circuit as claimed in claim 5, wherein, for a purpose of charging the heat exchanger with the hot water, the heat exchanger is connected to an intermediate-pressure feed water preheater.

7. The water-steam circuit as claimed in claim 1, wherein a jet pump, that is connected on a working medium side to a high-pressure or intermediate-pressure steam system, is connected into the waste steam pipe such that it is connected, on an intake medium side, to the steam outlet of the vessel and, on an outlet side, to the at least one low-pressure steam system.

8. The water-steam circuit as claimed in claim 7, wherein, for the second supply of heat a heat exchanger is disposed in the vessel, and wherein for a purpose of charging the heat exchanger with hot water, the heat exchanger is connected to a condensate preheater.

9. The water-steam circuit as claimed in claim 7, wherein the waste steam pipe discharges into a low-pressure steam line leading to a steam turbine.

10. The water-steam circuit as claimed in claim 1, further comprising:

at least one evaporator and at least one superheater connected downstream of the at least one evaporator, and, arranged between the at least one superheater and the at least one evaporator, a condensate collection and return line for intercepting condensate present in the at least one superheater and for returning the condensate into the at least one evaporator without passing through the vessel.

11. A method for purifying waste water of a power plant having a water-steam circuit, comprising:

guiding the waste water from a steam drum of the water-steam circuit into a vessel via a waste water inflow line, wherein the waste water from the water-steam circuit functions as a first supply of heat from the water-steam circuit to the vessel, and in addition to producing a steam fraction by automatic evaporation of waste water in the vessel, evaporating a water fraction that continues to accumulate using energy from the water-steam circuit, wherein the energy is received in the vessel via a discrete, second supply of heat from the water-steam circuit, and guiding a total steam mass flow from the vessel into a low-pressure steam system of the power plant.

12. The method as claimed in claim 11,

Wherein, as the second supply of heat from the water-steam circuit, intermediate-pressure steam or high-pressure steam is introduced into the vessel.

13. The method as claimed in claim 11,

Wherein, as the second supply of heat from the water-steam circuit, a heat exchanger is arranged in a water region of the vessel is charged on the primary side with water at a temperature that is above a temperature corresponding to an evaporation pressure in the vessel.

14. The method as claimed in claim 13, wherein the heat exchanger is charged with water from an intermediate-pressure feed water preheater.

15. The method as claimed in claim 11, wherein to pump the total steam mass flow a jet pump is operated with high-pressure or intermediate-pressure steam, and the jet pump causes a pressure reduction in the vessel and steam issuing from the jet pump is supplied to the low-pressure steam system.

16. The method as claimed in claim 15, wherein, as the second supply of heat from the water-steam circuit, a heat exchanger is arranged in a water region of the vessel, and wherein the heat exchanger is charged with water from a condensate preheater.

17. The method as claimed in claim 11, wherein relatively clean boiler waste water is intercepted by condensate collection and return lines assigned to individual pressure stages and is fed directly back to respective evaporators without passing through the vessel.

* * * * *